(12) United States Patent
Gunderson, III

(10) Patent No.: US 7,097,767 B2
(45) Date of Patent: Aug. 29, 2006

(54) METHOD OF CONTROLLING CONTAMINANT FLOW INTO WATER RESERVOIR

(75) Inventor: William F. Gunderson, III, Astoria, OR (US)

(73) Assignee: Gunderboom, Inc., Anchorage, AK (US)

(*) Notice: Subject to any disclaimer, the term of this patent is extended or adjusted under 35 U.S.C. 154(b) by 0 days.

(21) Appl. No.: 10/164,228

(22) Filed: Jun. 5, 2002

(65) Prior Publication Data

US 2003/0010727 A1    Jan. 16, 2003

Related U.S. Application Data

(60) Provisional application No. 60/295,994, filed on Jun. 5, 2001.

(51) Int. Cl.
*C02F 3/00* (2006.01)
*B01D 21/00* (2006.01)

(52) U.S. Cl. .............. 210/615; 210/747; 210/800; 210/151; 210/170; 210/242.1; 405/63

(58) Field of Classification Search .......... 210/615, 210/747, 800, 804, 150, 151, 170, 242.1; 405/63, 68, 110, 115
See application file for complete search history.

(56) References Cited

U.S. PATENT DOCUMENTS

| 2,699,117 | A |   | 1/1955  | La Prairie       |         |
|-----------|---|---|---------|------------------|---------|
| 3,659,713 | A |   | 5/1972  | Mueller          |         |
| 3,713,540 | A |   | 1/1973  | Davidson et al.  |         |
| 3,783,621 | A | * | 1/1974  | Preus et al.     | 405/63  |
| 3,979,289 | A |   | 9/1976  | Bykowski et al.  |         |
| 4,178,245 | A |   | 12/1979 | Nakaoka et al.   |         |
| 4,219,423 | A |   | 8/1980  | Smith, Jr.       |         |
| 4,288,321 | A |   | 9/1981  | Beane            |         |
| 4,296,884 | A |   | 10/1981 | Luebke           |         |
| 4,298,471 | A | * | 11/1981 | Dunkers          | 210/170 |
| 4,419,232 | A |   | 12/1983 | Arntyr et al.    |         |
| 4,573,426 | A | * | 3/1986  | Larsson          | 405/68  |
| 4,582,048 | A |   | 4/1986  | Sorensen         |         |
| 4,664,792 | A | * | 5/1987  | Fors et al.      | 210/747 |
| 4,669,972 | A |   | 6/1987  | Koblanski        |         |
| 4,692,059 | A |   | 9/1987  | Juutilainen      |         |
| 4,695,384 | A |   | 9/1987  | Ripl et al.      |         |

(Continued)

FOREIGN PATENT DOCUMENTS

FR    2195-238    8/1972

(Continued)

OTHER PUBLICATIONS

Steel and McGhee, "Water Supply and Sewerage" McGraw Hill, 1979, pp. 210-216.*

(Continued)

*Primary Examiner*—Christopher Upton
(74) *Attorney, Agent, or Firm*—Nixon Peabody LLP

(57) ABSTRACT

The present invention relates to methods of controlling contaminant flow into a water reservoir, reducing bacterial counts in a water reservoir, and reducing a count of dissolved constituents in a water reservoir, which methods include installing within a reservoir, about an inlet thereof, a boom comprising a support system and a curtain connected to the support system, the curtain being formed of a flexible fabric that allows movement of water therethrough and the curtain having a lower end and an upper end, the boom defining an artificial settling pond into which water, dissolved constituents and particulate matter from the inlet enters. The installation allows for settling of particulate matter larger than a minimum size and consumption of organic materials and dissolved constituents by aquatic vegetative flora and/or bacteria within the artificial settling pond.

11 Claims, 5 Drawing Sheets

U.S. PATENT DOCUMENTS

| | | |
|---|---|---|
| 4,749,479 A | 6/1988 | Gray |
| 4,880,333 A | 11/1989 | Glasser et al. |
| 4,919,820 A | 4/1990 | Lafay et al. |
| 5,102,261 A | 4/1992 | Gunderson, III |
| 5,197,821 A | 3/1993 | Cain et al. |
| 5,220,958 A | 6/1993 | Bernhardt |
| 5,225,622 A | 7/1993 | Gettle et al. |
| 5,322,629 A | 6/1994 | Stewart |
| 5,345,741 A | 9/1994 | Slater et al. |
| 5,354,456 A | 10/1994 | Montgomery et al. |
| 5,354,459 A | 10/1994 | Smith |
| 5,366,322 A * | 11/1994 | Hurwitt ................ 210/747 |
| 5,372,711 A | 12/1994 | Sill |
| 5,394,786 A | 3/1995 | Gettle et al. |
| 5,427,679 A | 6/1995 | Daniels |
| 5,558,462 A | 9/1996 | O'Haver |
| 5,893,978 A | 4/1999 | Yoda et al. |
| RE36,297 E | 9/1999 | Heino et al. |
| 5,992,104 A | 11/1999 | Hudak |
| 6,346,193 B1 | 2/2002 | Bauer |

FOREIGN PATENT DOCUMENTS

| | | |
|---|---|---|
| FR | 2284-709 | 5/1976 |
| FR | 2329-808 | 7/1977 |
| FR | 2579-239 A | 9/1986 |
| GB | 2 246 981 A | 2/1992 |
| WO | WO 91/07546 | 5/1991 |
| WO | WO 99/19570 | 4/1999 |
| WO | WO 01/94266 A1 | 12/2001 |

OTHER PUBLICATIONS

Eckenfelder "Principles of Water Quality Management" CBI 1980, pp. 138-140.*

* cited by examiner

METHOD OF CONTROLLING CONTAMINANT FLOW INTO WATER RESERVOIR

This application claims the benefit of U.S. Provisional Patent Application Ser. No. 60/295,994 filed Jun. 5, 2001, which is hereby incorporated by reference in its entirety.

FIELD OF THE INVENTION

The present invention relates to a method for controlling flow of contaminants into water reservoirs and other bodies of water.

BACKGROUND OF THE INVENTION

Containment/exclusion booms can be used to restrict and control the flow of contaminants from one side of the boom to the other. Such contaminants can cause stagnation of contained water, as in the case of surrounding any type of suspended sediment, organics, petroleum products (e.g., petroleum hydrocarbons), construction in or near water bodies, dredging, etc., as is seen with the use of sediment settling ponds, which are sometimes constructed with dams or earthen structures to allow adequate detention time for sediment settling. The reduced circulation of water within these structures as well as the biodegradation of organic material leads to reduced oxygen levels in the contained water. It would be desirable, therefore, to provide a containment/exclusion boom which can substantially contain pollutants and exclude them from surface runoff into drinking water reservoirs without causing stagnation behind the boom in the settling pond area.

The present invention overcomes these deficiencies of the art.

SUMMARY OF THE INVENTION

One aspect of the present invention relates to a method of controlling contaminant flow into a water reservoir which includes: defining a critical settling velocity for particulate matter entering into a reservoir at an inlet; determining a required surface area for a portion of the reservoir which is to function as an artificial settling pond; and installing within the reservoir, about the inlet, a boom comprising a support system and a curtain connected to the support system, the curtain being formed of a flexible fabric that allows movement of water therethrough and the curtain having a lower end and an upper end, the boom defining the artificial settling pond into which water and particulate matter from the inlet enters; wherein particulate matter larger than a minimum size settles from suspension within the artificial settling pond and at least a portion of particulate matter smaller than a minimum size is filtered by the curtain.

A second aspect of the present invention relates to a method of controlling contaminant flow into a water reservoir which includes: installing within a reservoir, about an inlet thereof, a boom comprising a support system and a curtain connected to the support system, the curtain being formed of a flexible fabric that allows movement of water therethrough and the curtain having a lower end and an upper end, the boom defining an artificial settling pond into which water and particulate matter from the inlet enters; said installing being carried out in a manner whereby particulate matter larger than a minimum size settles from suspension within the artificial settling pond and at least a portion of particulate matter smaller than a minimum size is filtered by the curtain.

A third aspect of the present invention relates to a method of reducing bacterial counts in a water reservoir into which bacteria and other pollutants are introduced from storm water runoff via natural or man-made inlets, the method including: defining a critical settling velocity for particulate matter entering into a reservoir at an inlet; determining a required surface area for a portion of the reservoir which is to function as an artificial settling pond; and installing within the reservoir, about the inlet, a boom comprising a support system and a curtain connected to the support system, the curtain being formed of a flexible fabric that allows movement of water therethrough and the curtain having a lower end and an upper end, the boom defining the artificial settling pond into which water and particulate matter from the inlet enters; wherein organic particulate matter larger than a minimum size settles from suspension within the artificial settling pond, a bacterial population in the artificial settling pond feeds upon and decomposes the organic matter, and upon partial depletion, the population thereof diminishes.

A fourth aspect of the present invention relates to a method of reducing bacterial counts in a water reservoir into which bacteria and other pollutants are introduced from storm water runoff via natural or man-made inlets, the method including: installing within a reservoir, about an inlet thereof, a boom comprising a support system and a curtain connected to the support system, the curtain being formed of a flexible fabric that allows movement of water therethrough and the curtain having a lower end and an upper end, the boom defining an artificial settling pond into which water and particulate matter from the inlet enters; said installing being carried out in a manner whereby organic particulate matter larger than a minimum size settles from suspension within the artificial settling pond, a bacterial population in the artificial settling pond feeds upon and decomposes the organic matter, and upon partial depletion, the population thereof diminishes.

A fifth aspect of the present invention relates to a method of reducing a count for dissolved constituents in a water reservoir into which dissolved constituents are introduced from storm water runoff via a natural or man-made inlet, the method including: installing within a reservoir, about an inlet thereof, a boom which includes a support system and a curtain connected to the support system, the curtain being formed of a flexible fabric that allows movement of water therethrough and the curtain having a lower end and an upper end, the boom defining an artificial settling pond into which water and dissolved constituents enter from the inlet; said installing being carried out in a manner whereby growth of an aquatic vegetative flora on the boom curtain and within the artificial settling pond feeds upon organic matter and dissolved constituents present in the water in the artificial settling pond, thereby reducing the count of dissolved constituents on the downstream side of the boom curtain relative to the count of dissolved constituents entering the artificial settling pond.

DETAILED DESCRIPTION OF THE INVENTION

Figure 1:
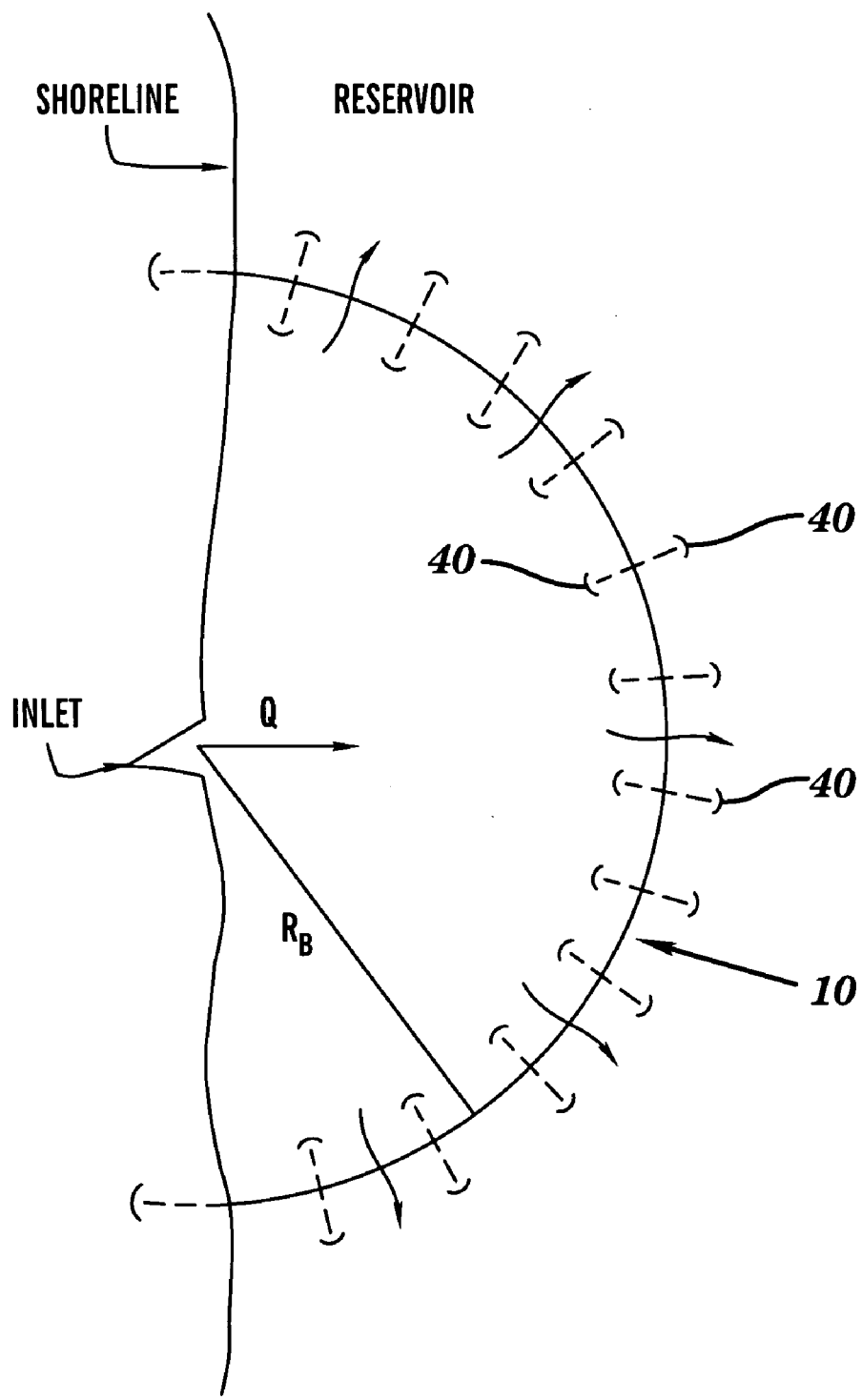
FIG. 1 is a plan view of an inlet (e.g., natural or man-made) into a reservoir or other body of water. The inlet possesses a flow rate (Q) and the boom is anchored about a perimeter situated a distance ($R_B$) away from the inlet, defining an artificial settling pond within the reservoir. The artificial settling pond is located upstream of the boom whereas the useful reservoir water is located downstream thereof.

The present invention relates to a method of controlling contaminant flow into a water reservoir. This aspect of the present invention involves controlling the water and suspended materials which flow from one or more inlets into a body of water such as a drinking water reservoir. The method is carried out by defining a critical settling velocity for particulate matter entering into a reservoir at an inlet, determining a required surface area for a portion of the reservoir which is to function as an artificial settling pond, and then installing within the reservoir, about the inlet, a boom which defines the artificial settling pond into which water and particulate matter from the inlet enters.

At a minimum, the boom includes a support system and a curtain connected to the support system, the curtain being formed of a flexible fabric that allows movement of water therethrough and the curtain having a lower end and an upper end. Preferably, the curtain extends substantially from the floor of the reservoir to its surface, i.e., substantially the entire water column. The boom systems are discussed in greater detail hereinafter.

Several factors contribute to the effectiveness of the present invention. First, when the curtains extends substantially the entire water column, the boom allows for full water column containment of suspended and floating contaminants. Second, because the boom is positioned outside of the zone of energy created by flow into the artificial settling pond at the inlet: (i) non-mobile sediment above a minimum particle size settle out, clarifying the water, and (ii) a portion of sediment below a minimum particle size, which does not settle, cannot pass through the curtain due to its pore size. Third, as fine sediments collect on the side of curtain toward the inlet (i.e., upstream side), a fine layer of aquatic vegetation grows. The aquatic vegetation consumes organic and inorganic materials, such as contaminants in the form of dissolved solids, within the water as it flows past the curtain. This enhances the natural biodegradation of contaminants which collect within the artificial settling pond.

To define a critical settling velocity for particulate matter entering into a reservoir at an inlet, the inlet is first identified and then an analysis is made of the water and particulate matter suspended therein. Typically, though not exclusively, the analysis is performed after substantial rainfall, such that a wide diversity of particles are suspended within the water flowing into the reservoir via the inlet. The inlet can be a natural inlet such as a stream, brook, creek, etc.; a naturally contoured region responsible for the introduction of significant amounts of surface water runoff into the body of water, such as significantly sloped terrain; or a man-made inlet such as a storm sewer drain.

The settling velocity of a particle in water is the downward velocity of the particle in the water. Thus, the settling velocity increases as the particle size and density increases, in accordance with Stokes' law:

$$v_s = \frac{g(\rho_p - \rho_w)d_p^2}{18\eta}$$

where $v_s$ is the terminal settling velocity
$\rho_p$ and $\rho_w$ are the particle and water density, respectively
$d_p$ is the particle diameter
g is the force of gravity
$\eta$ is the water viscosity Given a particular minimum-size/density particle to be removed, a critical settling velocity, $v_{sc}$, can be computed for use in sizing the required sedimentation pond. The critical settling velocity is equal to the surface overflow rate (SOR) of the pond, Q/A, where Q is the flow rate through the pond, and A is the pond area.

Typical critical settling velocities or surface overflow rates used for design of sedimentation tanks in water and wastewater treatment plants are in the range of 50 to 200 feet per day. Reservoir installations in accordance with the present invention can easily achieve values ten times lower, with correspondingly better sediment removal performance.

Given the calculation of the critical settling velocity, it is possible to determine the required surface area for a portion of the reservoir which is to function as the artificial settling pond (i.e. upon boom installation). The required surface area ($A_{req}$) of the settling pond is computed as $A_{req}=Q/v_{sc}$. Assuming a semi-circular boom installation 10 anchored around a discharge point or inlet (see FIG. 1), the required boom radius, $R_B$, is computed as:

$$R_B = \sqrt{\frac{2Q}{\pi v_{sc}}}$$

With the above calculations, it is possible to identify the appropriate position and, hence, the appropriate length of the boom. However, it is also desirable to identifying the required height of the boom curtain, such that it preferably will extend substantially the entire water column. Once these particular attributes of the yet to be fabricated boom have been determined, boom construction and installation can ensue.

A number of different containment/exclusion booms can be utilized in accordance with the present invention and installation thereof depends largely on the type of boom employed and, in particular, the type of support system that is utilized. The support system can be either a temporary support system which floats or a permanent or semi-permanent support system.

The temporary, floating support system is preferably formed of a plurality of flotation units which provide sufficient buoyancy to keep the boom afloat and to maintain freeboard. Conventional flotation units usable with the present invention include inflatable devices, air bags, and floats made from buoyant materials, such as cork, synthetic foams, and other plastics. However, conventional devices may not perform adequately under adverse conditions. It has been found that under adverse conditions, expanded polystyrene ("EPS") is especially suitable for use as the flotation unit. It is desirable to coat or seal the EPS to prevent deterioration associated with prolonged exposure to the elements. EPS is commercially available from ARCO Chemical Company as DYLITE® and can be formed or molded into flotation units of various sizes and shapes (e.g., cylindrical, square, etc.) as required by project design. The EPS has a positive buoyancy that keeps the flotation unit above the water surface at all times, allowing the flotation unit to ride the waves, even in adverse conditions. An EPS flotation unit is not deformed by wave action and does not lose buoyancy if punctured, as would an inflatable device. A single cubic foot of EPS can support as much as about 60 lbs (~27.2 kg). A commonly used size of flotation unit of EPS is about 12 inches (~30.5 cm) in diameter, but the size can be readily adapted to meet specific wave and environmental conditions (i.e., unique flood conditions) and depth requirements.

The permanent or semi-permanent support system can be used as an alternative to the floating support system afforded by use of the EPS or other buoyant materials. Such support systems can include pilings of conventional construction and horizontal support members (i.e., a wire, beam, catwalk, or other like support) which extend between adjacent pilings. The boom curtain can be connected to either the horizontal support members or both the horizontal support members and the pilings.

It is upon one or both of these types of support systems that a boom curtain is supported. The curtain is preferably formed of a geosynthetic fabric, which includes geotextiles, engineering fabrics, and filter fabrics and is defined to mean a water-pervious sheet of plastic fibers, filaments, or yarns that have been formed into a stable network such that the fibers, filaments, or yarns retain their relative position to each other. The geosynthetic fabric may be a woven product or a nonwoven, random construction of fibers.

The geosynthetic fabric is "water-pervious" or "water-permeable", meaning that water passes through the fabric. The permeability of geosynthetic fabric permits the passage of water through the main body portion of the curtain. Additionally, the fabric is hydrophobic, allowing the fabric to shed water rapidly to reduce the drag as water passes through the fabric.

Typically, the geosynthetic fabric will be "oleophilic", meaning that it absorbs or attracts oil (i.e., petroleum hydrocarbons), thereby blocking the flow of oil. For containment of silt and other suspended particulates, it is not essential that the curtain be oleophilic; obviously, for containment of oil, the curtain preferably is oleophilic. Useful geosynthetic fabrics are further characterized by high load distribution capacity, the ability to abate material filtration, and permeability to water. Geosynthetic fabrics are commercially available in a range of tensile strengths, permeabilities, and permittivities, and are useful for the purposes of the invention throughout those ranges.

Geosynthetic fabric may be prepared using one or a combination of various polymers, for example polyester, polypropylene, polyamides, and polyethylene. Most commercially available geosynthetic fabrics are polypropylene or polyester. Examples of suitable nonwoven geosynthetic fabrics include, but are not limited to, AMOPAVE® 4399, AMOPAVE® HD 4597, 4545, 4553, and 4561 (all polypropylene fabrics commercially available from Amoco Fabrics and Fibers Company); Typar®, a polypropylene fabric commercially available from Dupont; TREVIRA® Spunbond, a polyester fabric commercially available from Hoechst Fibers Industries. Examples of suitable woven geosynthetic fabrics include, but are not limited to, 1380 SILT STOP®, 1198, 1199, 2090, 2000, 2006 (all polypropylene fabrics commercially available from Amoco Fabrics and Fibers Company). One of ordinary skill in the art would be able to select appropriate geosynthetic fabrics to meet project-specific design requirements without undue experimentation.

The pore size of various geosynthetic fabrics can be selected based upon the calculated sediments which are introduced at a particular inlet. Suitable pore sizes, however, typically fall within the range of about 20–200 microns, preferably about 30 to about 100 microns, more preferably about 30 to about 70 microns.

The geosynthetic fabrics are nonbiodegradable, so they do not deteriorate due to environmental exposure. During prolonged use, exposure to ultraviolet (UV) light may cause some geosynthetic fabrics to weaken or deteriorate. However, UV-resistant fabrics are commercially available as well as UV resistance treatment methods.

For most applications, it is sufficient to construct the curtain with a single layer of geosynthetic fabric. However, for some applications, a multilayer construction may be desirable to provide added strength or protection against abrasion. The layers could be of the same geosynthetic fabric or different fabrics. For instance, a curtain might have a first layer of nonwoven fabric and a second layer of a woven fabric, which would tend to be more abrasive-resistant than the nonwoven fabric. The fabric can optionally be custom designed to provide for greater or lesser water flow therethrough, as described in U.S. patent application Ser. No. 09/168,491 to Gunderson et al., which is hereby incorporated by reference in its entirety.

Figure 2:
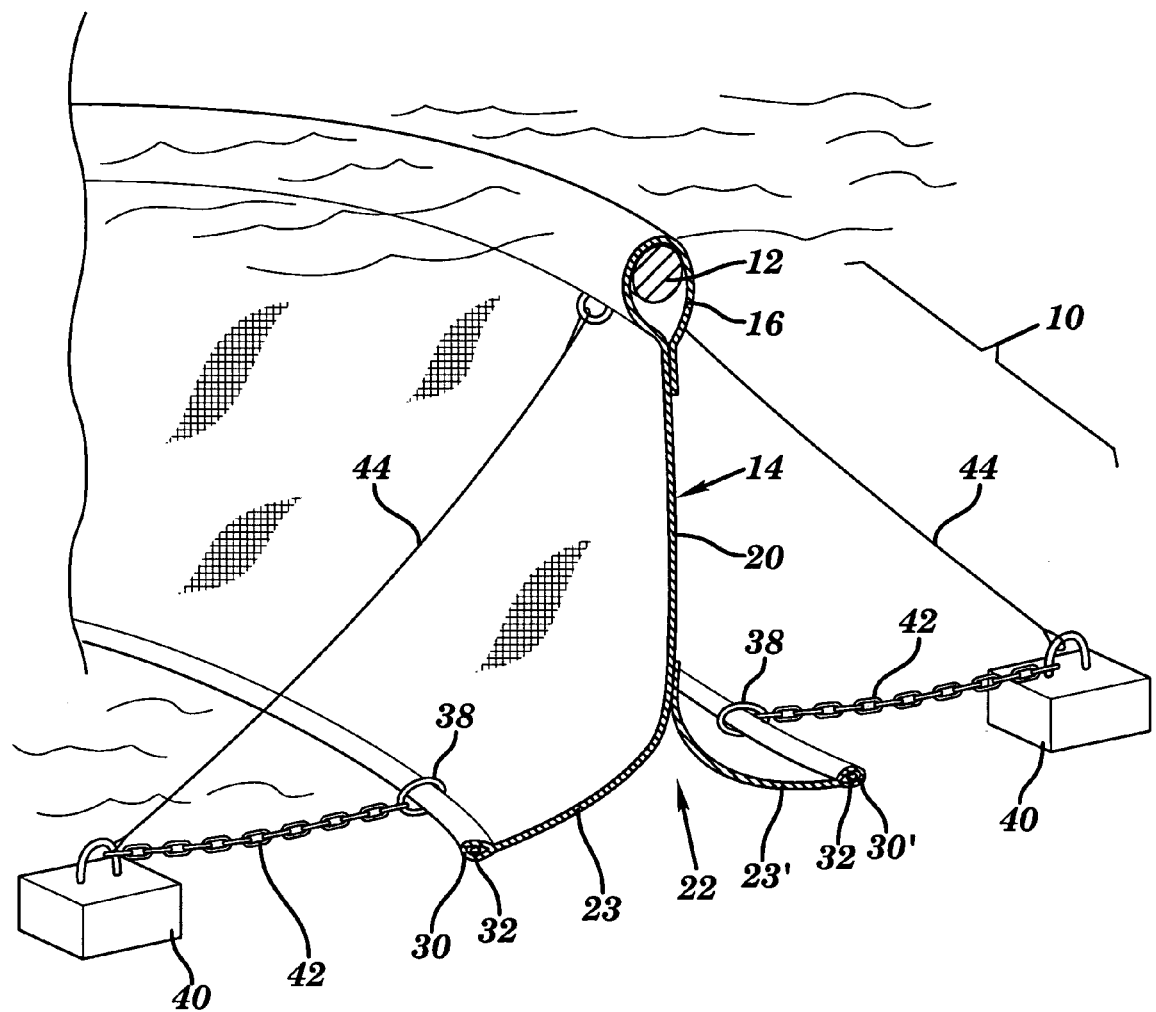
FIG. 2 is a perspective view of a boom installed into a reservoir or body of water in accordance with FIG. 1. The boom shown includes a flotation member to support the boom curtain and the boom curtain is adapted with an integrally formed Y-panel member that minimizes leakage between the floor of the body of water and the bottom of the curtain.

By way of example, in accordance with FIG. 2, a boom 10 includes a flotation unit 12 and an upper curtain member 14. The curtain member 14 has an upper sleeve 16 and a main sheet portion 20. The sleeve 16 is constructed by folding an upper edge portion of the material along a lengthwise fold line and securing the upper edge portion to the main sheet portion 20, e.g., by sewing, heat fusion, etc. The flotation unit 12, which may be in the form of one or more lengths of buoyant material, can then be inserted, prior to installation, into vertical slits cut in the upper sleeve 16 at predetermined intervals. Alternatively, the upper edge portion of the curtain member 14 can be folded around the flotation unit 12 and then secured to the main sheet portion 20, forming the upper sleeve 16 with the flotation unit 12 therein.

The lower edge of the curtain member 14 has integrally formed therewith and/or connected thereto a Y-panel member 22. The Y-panel member 22 includes a pair of skirt panels 23,23'. The distal ends of the skirts can be coupled with ballast or anchoring devices for purposes of maintaining the distal ends of the first and second skirts 23,23' substantially against the floor of a body of water (i.e., upon introduction of the containment/exclusion boom into the body of water). This can be achieved by folding the distal ends thereof along a lengthwise fold line and securing the ends to the body of the skirt, e.g., by sewing, heat fusion, etc., thereby forming sleeves 30,30'.

Ballast 32 such as lengths of steel chain (from less than ⅛ inch to over ¾ inch) or steel cable (from less than ¾ inch to over 1½ inches in diameter) have been used inside sleeves 30,30'. Of course, chains and cables of greater or less diameter may be used to meet the specific requirements of a project design. It is not always necessary to form the sleeves 30,30' on the first and second skirts 23,23' to contain ballast. straps 38 connected (e.g., by heat sealing, sewing, etc.) adjacent the distal ends thereof for purposes of connecting the distal ends to cables or chains 42 which attach at their opposite ends to anchors 40. This is particularly advantageous when the containment/exclusion boom is utilized in adverse wave and current conditions and ballast 32 alone may not be sufficient to maintain the boom 10 in place or the curtain 14 in a substantially vertical orientation. The anchor(s) can be temporarily installed anchors or permanent anchors. When such anchors are utilized it is also desirable to stabilize the upper end of the curtain member 14 (or sleeve 16) using cables or wires 44. For booms of considerable length, anchors preferably are attached at regular intervals (as shown in FIG. 1).

Other variations of containment/exclusion booms that possess a Y-panel member are described in greater detail in U.S. patent application Ser. No. 10/134,359, filed Apr. 26, 2002, which is hereby incorporated by reference in its entirety.

Figure 3:
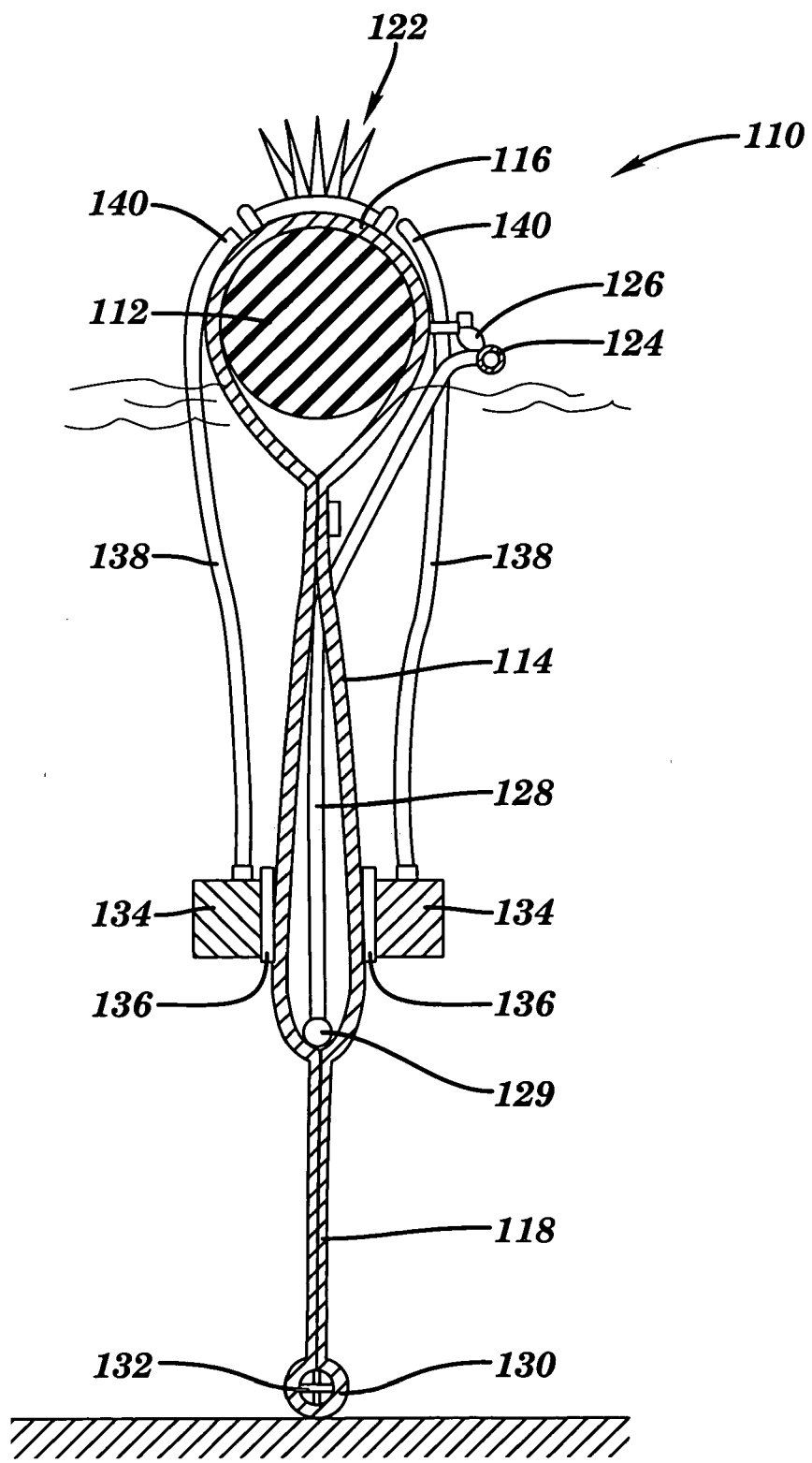
FIG. 3 is a cross-section view of a boom adapted for use in accordance with FIG. 1. The boom shown includes an air injection system to remove any fouling material impinged against the upstream side of the curtain, a bird deterrent device secured to the upper sleeve of the curtain, and sampling equipment located on both the upstream and downstream sides of the curtain to facilitate the acquisition of water samples.

By way of example, in accordance with FIG. 3, a boom 110 includes a curtain member 114 having an upper sleeve 116 into which has been inserted a flotation unit 112 (as described above with respect to boom 10). Curtain 114, however, includes a multi-layered construction, having a sheet of fabric material facing the upstream side and a sheet of fabric material facing the downstream side. The lower edge of curtain 114 includes a region 118 where the two sheets of fabric material have been sewn or fused together to define a lower sleeve 130 that includes ballast 132 (which can be of the same type describe above).

Attached to the upper sleeve 116, i.e., at the apex thereof when placed in the water, is a bird deterrent device 122. The bird deterrent device 122 can be of the type described in U.S. patent application Ser. No. 09/849,466 to Dreyer, which is hereby incorporated by reference in its entirety.

Boom 110 also includes a gas injections system of the type described more fully in U.S. patent application Ser. No. 09/168,491 to Gunderson et al., which is hereby incorporated by reference in its entirety. Basically, the gas injections system includes a separate gas pumping device which can be coupled in fluid communication with one or main delivery conduits 124 connected to the sleeve 116 (shown) or elsewhere on the curtain 114 using a suitable coupling device 126 (e.g., wire connector). The main delivery conduits are connected to generally inverted T-shaped diffusion tubes whose upper stems 128 connect to the delivery conduit and whose lower diffuser 129 is perforated to release gas bubbles along the length thereof.

In use, the gas injection system can be used periodically to cause fine sediments impinging against either side of the curtain, but typically the upstream side thereof, to fall away from the curtain. The rising gas, which expands, not only shakes the fine sediments from the curtain but also creates a fizz that carries the sediment upwardly and away from the curtain.

If air is used as the gas, then the air injection system also serves to increase the level of oxygenation within the artificial settling pond to further retard the development of stagnation.

Another component of the boom 110 is the sampling equipment located on both the upstream and downstream sides of the curtain to facilitate the acquisition of water samples. The sampling equipment includes first and second sampling ports 134 connected to the boom curtain 114 using, e.g., hook and loop fasteners 136. The sampling ports 134 are connected to a sampling conduit 138 whose upper end 140 is attached to the sleeve 116 above the water level. Two or more such sample ports and accompanying conduits can be provided to allow for sampling of water from either side of the boom and at various depths.

Any of the foregoing components of the boom curtain can be combined together to form alternative embodiments to those described above.

Figure 4:
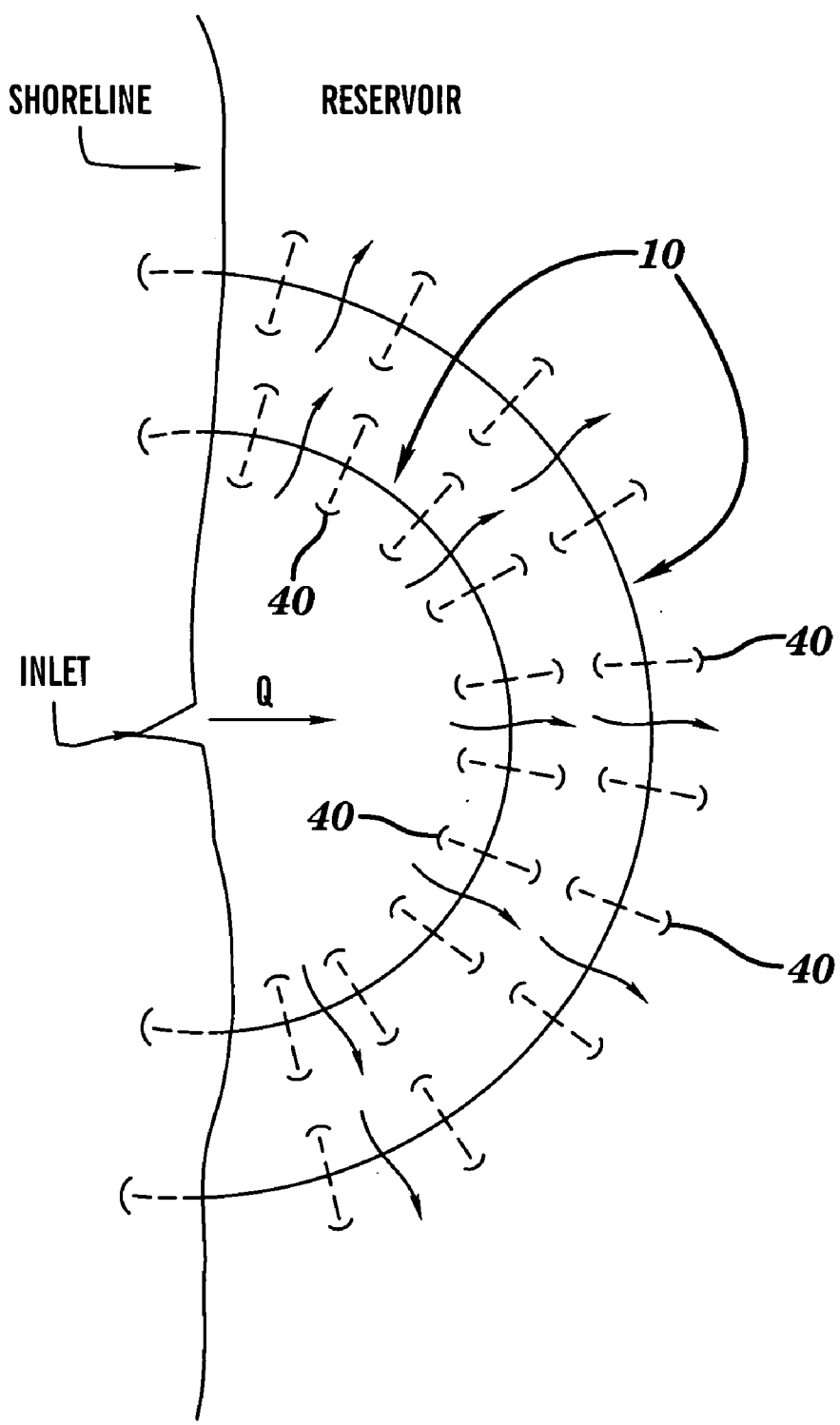
FIG. 4 is a plan view of an inlet (e.g., natural or manmade) into a reservoir or other body of water. The inlet possesses a flow rate (Q) and a primary boom is anchored about a perimeter situated a distance away from the inlet, defining an artificial settling pond within the reservoir. The artificial settling pond is located upstream of the boom. A second boom is anchored about a perimeter situation a substantially fixed distance away from the primary boom, defining a secondary artificial settling pond. The useful reservoir water is located downstream of the secondary artificial settling pond.

When a boom 110 is utilized in accordance with the present invention, it may be useful to provide a second boom (either with or without a gas injection system, but preferably without) as shown in FIG. 4. During use of the gas injection system for self-cleaning of the curtain 114 it is possible for accumulated fine sediments to be disbursed through the curtain 114. Thus, depending on the nature and quantity of the fine sediments, is may be desirable to install an outer (i.e., downstream), secondary boom located a sufficient distance from the primary boom to facilitate settling of the fine sediments. The curtain of the secondary containment boom shall be water-permeable with an apparent opening size no greater than the accumulated fine sediments. The same calculations used to determine the location and critical settling velocity of the sediments entering the artificial settling pond can be used to determine the criteria need for the secondary artificial settling pond.

Regardless of the particular boom construction, the two ends of the boom are preferably anchored to the shoreline in an manner which facilitates not only maintaining the ends of the boom in a desired location but also to facilitate the boom adapted to different water levels within the reservoir (i.e., during both wet seasons and dry seasons when water levels fluctuate widely). This is illustrated schematically in FIGS. 1 and 4.

Figure 5:
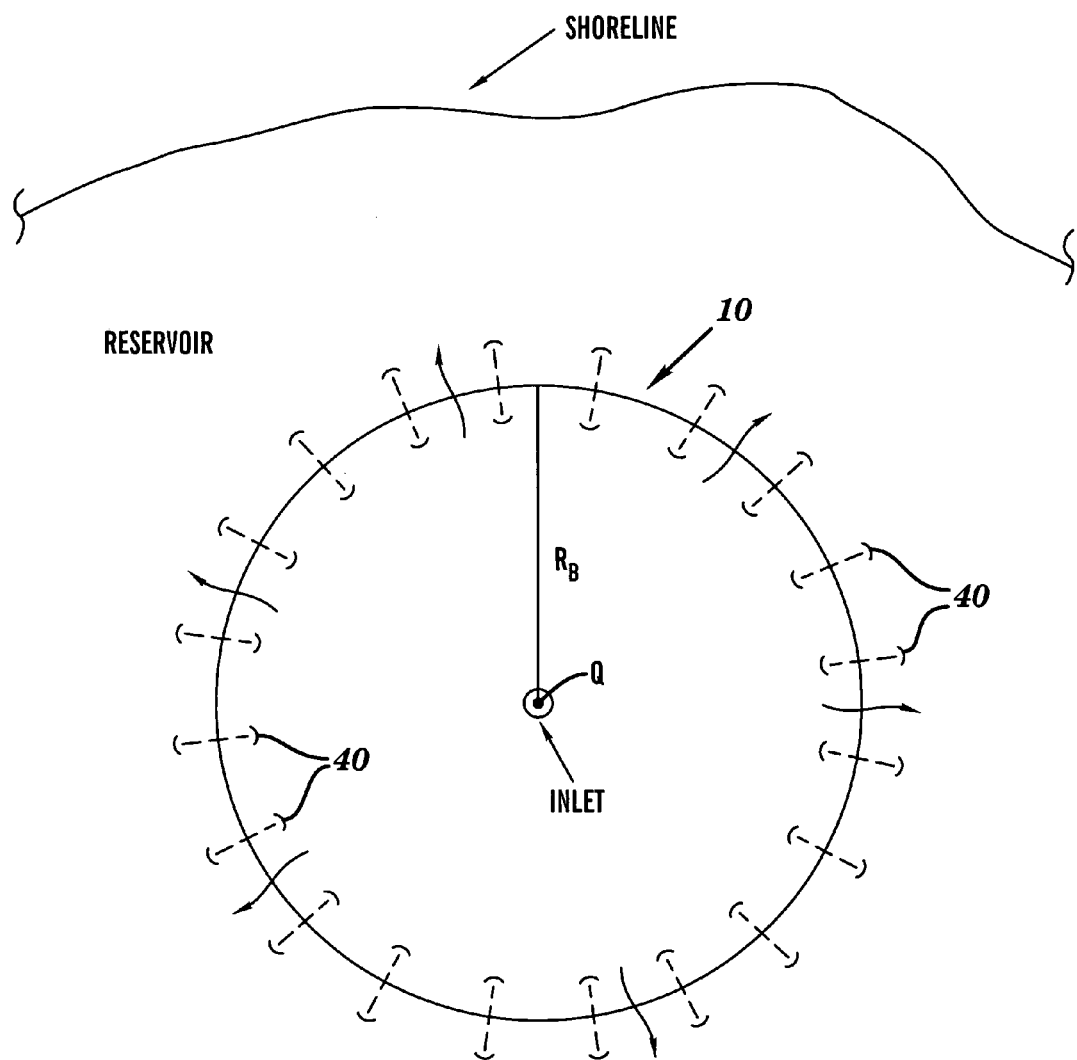
FIG. 5 is a plan view of an inlet (e.g., mad-made) present in the floor of a reservoir or other body of water. The inlet in this instance possess a flow rate (Q) initially directed in an upward direction. A single boom is anchored about a continuous perimeter situated a distance away from the inlet, defining an artificial settling pond within the reservoir (i.e., located internally of the continuous perimeter boom configuration). The upstream region is defined within the boom configuration. The useful reservoir water is located downstream or externally of the boom configuration.

Alternatively, as shown in FIG. 5, some inlets to reservoirs are provided at within the body of water, as a standing pipe whose outlet can be at any water depth (i.e., at the bottom or somewhere below the water surface but above the bottom). In this arrangement, an annular boom configuration can be employed, where the two ends of the boom are joined together rather than being anchored to the shoreline as shown in FIGS. 1 and 4.

The boom of the present invention can also include additional features or components which are known and disclosed, for example, in U.S. Pat. No. 5,102,261 to Gunderson, III, which is hereby incorporated by reference in its entirety. Exemplary of such additional features or components include: tow cords, which are used for towing floating booms into position in a body of water or simply from one location to another; and connector straps (preferably with industrial hook-and-loop fastening strips), which are used to connect two lengths of the boom together to form a single continuous structure having overlapping curtain structures. For the sake of clarity, such features have not been shown in the accompanying Figures.

The vertical dimension of the curtain can be increased by securing additional sheets of geosynthetic fabric together along their coextending edges until the desired height is obtained.

Sewing or heat fusion of the geosynthetic material can be used to form the sleeves, to connect multiple sheets together to add additional height, or to attach the tow cords, stirrups for attaching chains or anchors lines, etc. The geosynthetic fabric can be sewn with a conventional industrial sewing machine, and heat fusion can be accomplished with an industrial iron. Heat fusion can also be accomplished by puncturing or piercing through the overlapped geosynthetic fabric with a soldering iron. Good, strong connections have been made this way.

Booms according to the present invention can be manufactured to any desired length by securing sheets of geosynthetic fabric together. The manufacture of booms of the invention require the least possible number of in-the-field seam connections. The boom is relatively simple to assemble, providing fewer failure points, faster deployment, less on-site equipment, lower on-site labor requirements, and safer assembly conditions. Other advantages of the invention include flexibility, durability, ease of storage in conventional crates or on reels, and ease of deployment.

Depending upon the environmental, wave, and current conditions, anticipated load requirements, and other parameters, the appropriate geosynthetic fabric, tow cord, ballast, and flotation unit can be selected to meet the specific design requirements for a given use of the boom. Other relevant parameters for the boom include, but are not limited to, water depth, particulate size, length of time the boom is to be in place, pollutant composition, and the availability of manpower and equipment.

The use of booms in accordance of the present invention provides for the creation of an artificial settling pond within a larger body of water. Settling of particulate matter is achieved by the distribution of flow rates in a manner that reduces the water flow velocity to a point that is lower than the rate required to keep the typical storm water particulate in suspension. (Using the simplified surface overflow rate (SOR), the ratio of discharge rate-in cfs-to the surface area-in.ft./sec.—can provide a SOR of 0.0001 or less. Storm water particulates typically have a specific gravity of 1.5 to 2.5 which corresponds to a critical settling rate of about 0.0001 for sub-micron particles.) As new storm water collects behind the curtain a differential head is produced which drives water across the curtain. Any fines still in suspension will be filtered by the curtain. This slow diffusion of water through the curtain allows the contaminated water to be treated by effective sedimentation.

Unlike other sediment settling ponds which are usually constructed out of water impermeable materials, the boom of the present invention allows water to continuously flow through the entire cross-sectional volume of the artificial settling pond, not just the surface areas that traditional settling ponds provide for with overtopping weirs. This provides for a continuous flow of fully oxygenated water and a full matrix water exchange to pass by encaptured pathogens, setting up a biodegradation process and eliminating stagnation that comes as a function of lower dissolved oxygen (DO) counts. The artificial settling pond effectively becomes a semi-natural wastewater treatment pond where pollutants are collected as storm water flows into the confined area. The dissolved constituents (including both minerals and dissolved organic materials) and other organic materials are consumed/decomposed through natural processes. Without necessarily being bound by theory, it is believed that that artificial settling pond promotes the growth of microfauna and microflora that develop on the surface of the fibers of the filter curtain. The population of microfauna and microflora assimilate nutrients, dissolved organic and inorganic compounds, from water in contact with or passing through the boom. By the presence of the microfauna and microflora, the boom system further reduces dissolved substances, including dissolved minerals and organic materials, and the resultant water is lower in these substances and lower in total dissolved solids ("TDS"). Except during periods of high flow, such as after a heavy wet weather event, this assimilation results in measurable reductions in TDS and other dissolved compounds. Thus, the artificial settling pond controls the pollutants from spreading throughout the reservoir and into drinking water distribution systems. Outside the boomed area (i.e., downstream of the boom), the aquatic microfauna and microflora lacks sufficient quantities of dissolved constituents and other organic and inorganic materials on which to thrive.

As a further added benefit of the present invention, bacteria counts can be reduced when comparing the water quality upstream of the boom curtain to the water quality downstream of the boom curtain. Without being bound by theory, it is believed that bacteria suspended on the particulate matter is either settled out of the water before contacting the curtain or filtered out of the water by the curtain. Therefore, another aspect of the present invention relates to a method of reducing bacterial counts in a water reservoir. This method is carried out according to the same steps set forth above.

By effectively increasing the microorganism count on the upstream side of the curtain, organic and inorganic substrates are consumed with the constantly replenished oxygenated water passes through the curtain to the downstream side, where reduced total suspended particulate matter is accompanied by a reduced total microorganism count (i.e., much of the organic and inorganic substrate is consumed in the artificial settling pond).

EXAMPLE

The following example is intended to illustrate, but by no means are intended to limit, the scope of the present invention as set forth in the appended claims.

Example 1

Examination of Plain-settling Opportunities Behind the Gunderboom™ Filter Barrier Type 1 settling (likely to be the most important settling mechanism for stormwater sedimentation processes) can usually be predicted using the simplified surface overflow rate (SOR), where the critical settling velocity (in ft/sec) can be determined using the ratio of the discharge rate (in cfs) to the surface area (in ft/sec). Obviously hindered settling, flocculation, and short-circuiting can also be occurring in sediment ponds, but the simple description of the settling by the SOR approach accounts for the vast majority of settling that occurs in ponds over long periods of time based on actual pond monitoring. The given maximum design flow for this test installation is 5,000 gpm, or about 11 cfs. The boom was 350 ft long (sized to provide a unit area flow rate through the curtain of between 3 and 10 gpm/ft$^2$). The enclosed area was estimated to be about 100,000 ft$^2$. The SOR for this facility was therefore about 0.00011 ft/sec. Theoretically, all particles settling faster than this rate would be trapped within the curtain due to sedimentation, although short-circuiting and scour permits some limited amounts of larger particles to leave the sedimentation area. It is expected that this installation would minimize short-circuiting and scour problems.

With a specific gravity of between 1.5 and 2.5 (typical for stormwater particulates), a critical settling rate of about 0.0001 ft/sec would correspond to sub-micron particles. This would correspond to a well-designed and operated wet detention pond that could trap more than 90% of the sediment in the flowing water. In other words, the filter fabric curtain slows and contains the water in a limited area, allowing much of the stormwater pollutants to be trapped as sediment in the pool area. It is unlikely to be functioning as a "filter" with material actually being trapped on the curtain and falling to the bottom as it drops from the fabric. It is expected that the majority of the sediment in the contained area is located near the inlet entrance to the confined area and not near the bottom of the fabric curtain.

The curtain was a two-ply fabric with an off-set volume between fabric layers. The water moves through the curtain at an extremely slow rate (about 0.007 to 0.02 ft/sec), or approximately 3 to 9 gallons per minute (at peak flows). Based upon examination of water from upstream and downstream locations, it was determined that the curtain effectively "isolated" the more contaminated water from the inlet and did not enable that more contaminated water to mix with the reservoir water. The slow diffusion of water through the curtain allowed the contaminated water to be treated by effective sedimentation. As a result, when the influent concentrations were relatively high, the Gunderboom® fabric did provide significant and important reductions of the larger particles (i.e., greater than 20 microns). In addition, once the boom had been installed for some time, the establishment of an aquatic vegetative flora on the curtain surface afforded reductions in dissolved constituents (i.e., mineral content) as well as some of the smaller particulate matter which initially passed through the boom curtain. It is believed that the aquatic vegetative flora utilized dissolved constituents as nutrient sources for their growth. Because of dissolved constituent depletion on the upstream side of the boom, downstream water quality was enhanced.

Although preferred embodiments have been depicted and described in detail herein, it will be apparent to those skilled in the relevant art that various modifications, additions, substitutions, and the like can be made without departing from the spirit of the invention and these are therefore considered to be within the scope of the invention as defined in the claims which follow.

What is claimed is:

1. A boom comprising:
    a support system,
    a curtain connected to the support system, the curtain being formed of a flexible fabric that allows movement of water therethrough and being sized and configured such that, upon introduction into a body of water, the curtain extends substantially the entire water column; and
    first and second sample ports positioned on opposite sides of the curtain, each comprising a conduit that has an upper end and a lower end, whereby upon introduction of the boom into the body of water the lower end of each sample port is below the water level.

2. The boom according to claim 1 further comprising ballast secured to a lower end of the curtain.

3. The boom according to claim 1 wherein the boom curtain includes first and second sheets of the flexible fabric and the boom further comprises a gas injection system that includes an outlet positioned between the first and second sheets of flexible fabric.

4. A method of controlling contaminant flow into a water reservoir comprising:
    defining a critical settling velocity for particulate matter entering into a reservoir at an inlet;
    determining a required surface area for a portion of the reservoir which is to function as an artificial settling pond; and
    installing within the reservoir, about the inlet, a boom comprising a support system, a curtain connected to the support system, the curtain being formed of a flexible fabric that allows movement of water therethrough and being sized and configured such that, upon introduction into a body of water, the curtain extends substantially the entire water column, and first and second sample ports positioned on opposite sides of the curtain, each comprising a conduit that has an upper end and a lower end, whereby upon introduction of the boom into the body of water the lower end of each sample port is below the water level;
    wherein the boom defines the artificial settling pond into which water and particulate matter from the inlet enters;
    wherein particulate matter larger than a minimum size settles from suspension within the artificial settling pond and at least a portion of particulate matter smaller than a minimum size is filtered by the curtain; and
    wherein water samples obtained from the opposite sides of the curtain, via the first and second sample ports, allow for assessing efficacy of the boom in controlling contaminant flow into the reservoir.

5. The method according to claim 4, wherein the boom curtain includes first and second sheets of the flexible fabric and the boom further comprises a gas injection system which includes an outlet positioned between the first and second sheets of flexible fabric, said method further comprising:
    injecting gas into the water between the first and second sheets of flexible fabric, said injecting removing particulate matter impinging upon one or both sheets of flexible fabric.

6. A method of reducing bacterial counts in a water reservoir into which bacteria and other pollutants are introduced from storm water runoff via natural or man-made inlets, the method comprising:
    defining a critical settling velocity for particulate matter entering into a reservoir at an inlet;
    determining a required surface area for a portion of the reservoir which is to function as an artificial settling pond; and
    installing within the reservoir, about the inlet, a boom comprising a support system, a curtain connected to the support system, the curtain being formed of a flexible fabric that allows movement of water therethrough and being sized and configured such that, upon introduction into a body of water, the curtain extends substantially the entire water column, and first and second sample ports positioned on opposite sides of the curtain, each comprising a conduit that has an upper end and a lower end, whereby upon introduction of the boom into the body of water the lower end of each sample port is below the water level, wherein the boom defines the artificial settling pond into which water and particulate matter from the inlet enters;

wherein organic particulate matter larger than a minimum size settles from suspension within the artificial settling pond, a bacterial population in the artificial settling pond feed upon and decompose the organic matter, and upon partial depletion, the population thereof diminishes; and wherein water samples obtained from the opposite sides of the curtain, via the first and second sample ports, allow for assessing efficacy of the boom in reducing bacterial counts in the water reservoir on the downstream side of the curtain.

7. The method according to claim 6, wherein the total quantity of organic matter passing into the reservoir is diminished by the presence of the artificial settling pond and the bacterial population within the reservoir is substantially reduced.

8. The method according to claim 6, wherein the boom curtain includes first and second sheets of the flexible fabric and the boom further comprises a gas injection system which includes an outlet positioned between the first and second sheets of flexible fabric, said method further comprising:

injecting gas into the water between the first and second sheets of flexible fabric, said injecting removing particulate matter impinging upon one or both sheets of flexible fabric.

9. A method of controlling contaminant flow into a water reservoir comprising:

defining a critical settling velocity for particulate matter entering into a reservoir at an inlet;

determining a required surface area for a portion of the reservoir which is to function as an artificial settling pond;

installing within the reservoir, about the inlet, a boom comprising a support system and a curtain connected to the support system, the curtain including first and second sheets of a flexible fabric that allows movement of water therethrough and the curtain having a lower end and an upper end, the boom defining the artificial settling pond into which water and particulate matter from the inlet enters, and the boom further comprising a gas injection system which includes an outlet positioned between the first and second sheets of the flexible fabric; and injecting gas into the water between the first and second sheets of flexible fabric, said injecting removing particulate matter impinging upon one or both sheets of flexible fabric;

wherein particulate matter larger than a minimum size settles from suspension within the artificial settling pond and at least a portion of particulate matter smaller than a minimum size is filtered by the curtain.

10. A method of controlling contaminant flow into a water reservoir comprising:

defining a critical settling velocity for particulate matter entering into a reservoir at an inlet;

determining a required surface area for a portion of the reservoir which is to function as an artificial settling pond;

installing within the reservoir, about the inlet, a boom comprising a support system and a curtain connected to the support system, the curtain being formed of a flexible fabric that allows movement of water therethrough and the curtain having a lower end and an upper end, the boom defining the artificial settling pond into which water and particulate matter from the inlet enters;

wherein particulate matter larger than a minimum size settles from suspension within the artificial settling pond and at least a portion of particulate matter smaller than the minimum size is filtered by the curtain;

defining a critical settling velocity for particulate matter that is smaller than the minimum size of the artificial settling pond and passes through the curtain of the boom;

determining a required surface area for a second portion of the reservoir which is to function as a secondary artificial settling pond; and installing within the reservoir, about the first boom, a second boom comprising a support system and a curtain connected to the support system, the curtain being formed of a flexible fabric that allows movement of water therethrough and the curtain having a lower end and an upper end, the boom defining the secondary artificial settling pond into which water and particulate matter from the artificial settling pond enters;

wherein particulate matter smaller than the minimum size of the artificial settling pond but larger than a minimum size for the secondary settling pond settles from suspension within the secondary artificial settling pond.

11. A method of reducing bacterial counts in a water reservoir into which bacteria and other pollutants are introduced from storm water runoff via natural or man-made inlets, the method comprising:

defining a critical settling velocity for particulate matter entering into a reservoir at an inlet;

determining a required surface area for a portion of the reservoir which is to function as an artificial settling pond;

installing within the reservoir, about the inlet, a boom comprising a support system and a curtain connected to the support system, the curtain being formed of first and second sheets of a flexible fabric that allows movement of water therethrough and the curtain having a lower end and an upper end, the boom defining the artificial settling pond into which water and particulate matter from the inlet enters, and the boom further comprising a gas injection system which includes an outlet positioned between the first and second sheets of flexible fabric; and injecting gas into the water between the first and second sheets of flexible fabric, said injecting removing particulate matter impinging upon one or both sheets of flexible fabric;

wherein organic particulate matter larger than a minimum size settles from suspension within the artificial settling pond, a bacterial population in the artificial settling pond feed upon and decompose the organic matter, and upon partial depletion, the population thereof diminishes.

* * * * *